July 15, 1958 — E. TOMASSINI — 2,842,806
FOLDING CABIN FOR CAMPING PURPOSES
Filed March 15, 1955
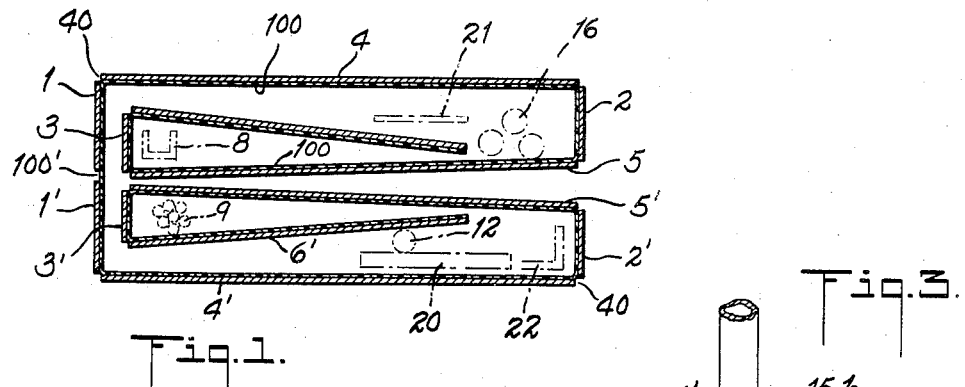
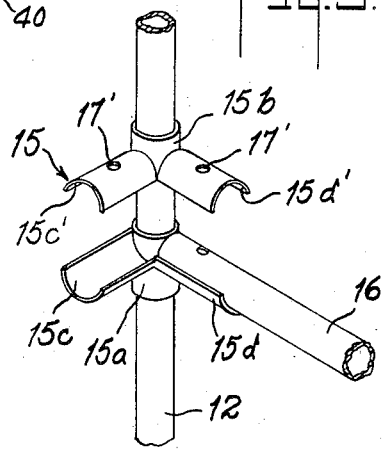
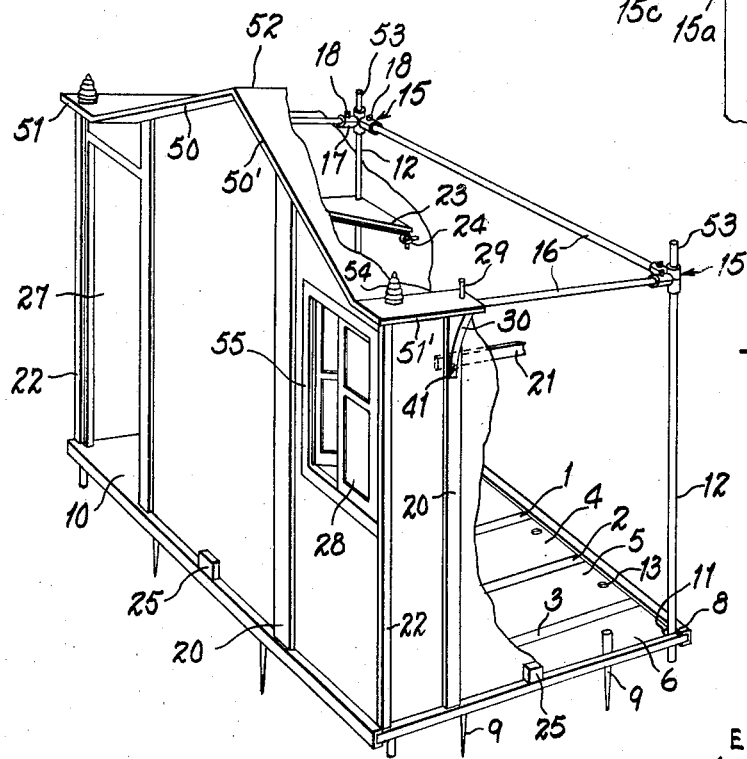
INVENTOR.
EMILIA TOMASSINI
BY Walter S. Bleston
ATTORNEY United States Patent Office 2,842,806
Patented July 15, 1958

2,842,806

FOLDING CABIN FOR CAMPING PURPOSES

Emilia Tomassini, Rome, Italy

Application March 15, 1955, Serial No. 494,389

7 Claims. (Cl. 20—2)

The invention relates to a foldable or collapsible cabin. Frequently prefabricated housings are made collapsible and portable so that they can be easily transported by train or truck and readily assembled and dismantled even by unskilled hands. However, the conventional buildings of the mentioned kind require several days and several men for their erection and, therefore, are not useful for the average tourist or vacationer who may change his overnight stopping place daily or at least rather frequently.

The invention aims to avoid the mentioned drawback and to provide, particularly for camping purposes, a demountable or collapsible cabin which can be conveyed on the top of a normal passenger car or in a small trailer. The invention, furthermore, aims to provide a collapsible cabin which can be erected substantially with the same speed as a tent but which gives more comfort and protection under adverse weather conditions.

Another object of the invention is the provision of a collapsible cabin of which the majority of parts forming the roof, walls and floor are preferably rectangular in shape and are foldable into units comprising a continuous flexible, water-proof layer covering sectional rigid panels. In the assembled condition of the cabin according to the invention the flexible layer forms the outermost skin or cover of the cabin, and together with the panels adhering thereto it encompasses a frame of demountable frame members and prevents wind and water from penetrating into the interior of the cabin. In the dismantled state, the flexible cover permits the panels of a unit to be folded upon one another so that each unit forms a readily portable package.

Another object of the invention is to provide a cabin of the mentioned type which is very rigid and resistant when assembled, but which, in the dismantled condition, can be folded so that the roof, walls and floor units with their accessories can be packed in e. g. three or four bags.

Further objects and details of the invention will be apparent from the following description and the accompanying drawing illustrating an embodiment thereof by way of example.

In the drawing:

Fig. 1 is a cross-sectional diagrammatic view of a folded unit of a cabin according to the invention, Fig. 2 is a perspective view, partly in section of an assembled cabin of which the unit of Fig. 1 forms a part, Fig. 3 is a perspective view of a corner connection or coupling.

Referring now to the drawing, Fig. 1 illustrates a folded floor unit, and it will be understood that the roof, as another unit, may be folded in a similar manner, whereas the four walls, on account of their large area, preferably form two foldable units. The floor unit of Fig. 1 comprises a flexible continuous layer 100 and a plurality of rigid panels, shown in heavy lines and denoted by 1 to 6 and 1' to 6'. The flexible layer 100 consists of a water-proof material, such as rubber or a synthetic substance, which does not become brittle after repeated folding at right angles. The panels are of a suitable rigid material, for instance of a quarter of an inch thickness. The panels of a unit are glued or cemented or otherwise made to adhere to the continuous outer layer so that they abut edgewise when the layer 100 is spread out. The panels of a unit are of different widths, as clearly shown in Fig. 1. The illustrated arrangement of the panels is selected and aims, on the one hand, to avoid the necessity of folding the flexible layer through substantially more than 90° in order to ensure a longer usefulness and, on the other hand, to render it possible so to fold the unit that it forms a handy package substantially rectangular in cross-section and in which there is still sufficient space to accommodate accessorial parts of the cabin. For this purpose, the panels on each side of the middle portion 100' of layer 100 are folded inwards so that the flexible layer is on the inside of the folded package. This is rendered possible by making the panels from the middle 100' towards each side alternatingly narrower and wider, wherein the narrower panels as well as the wider panels decrease in width towards the in-rolled ends. Thus, panels 1, 2 and 3 are narrower than panels 4, 5 and 6, and panel 2 is narrower than 1, panel 3 is narrower than 2, panel 5 is narrower than 4 and panel 6 is narrower than 5. The relative dimensions of panels 1' to 6' are substantially the same as those of panels 1 to 6, respectively. It is possible to make panels 1 and 1' of one piece without changing the stated principle. The accommodation of accessorial parts, which will be described hereinafter, is indicated in dash lines with reference numerals such as 8, 9, 12, 16 and 20 to 22. The wall units and the roof unit may be similarly designed. However, if the roof is of the gable roof type, some of the wall unit panels may be of trapezoidal rather than of rectangular shape. It will be noted and it is considered an essential advantage that all the units forming the floor, roof and walls according to the invention are free from any metal hinges.

Means may be provided to stiffen the units when assembled. In order to stiffen the floor, two channel bars 8 are provided which extend transversely of the slits 40, where in the assembled state of the floor the panels abut one another. As apparent from Fig. 2, the opposite edges of the floor engage into the bar channels. Similarly, the walls of the cabin may be stiffened by L-bars applied to the four corners of the cabin. Also vertical slats or strips 20 may be used to cover the outer layer 100 where the slits 40 occur in the walls on the inside of the cabin. The vertical strips may be held in position by horizontal strips 21 or by furniture parts. When the cabin is dismantled, the bars 8 and 22 and strips 20 and 21 form separate parts which may be packaged together with poles 12 within the units folded as in Fig. 1.

A tubular cage-like frame supports the structure of the cabin. The frame is constructed of demountable members which comprise four corner posts 12 and horizontal tubes 16 connected by coupling pieces 15 to the posts 12 a short distance below the upper ends of the latter. As clearly shown in Fig. 3, each corner piece 15 comprises a vertical sleeve 15a through which a post 12 extends. The sleeve 15a may be permanently or releasably secured to the post 12. From the sleeve 15a two half shells 15c and 15d extend at right angles to each other. In each of the half shells an end of one of the tubes 16 is to be inserted. Another sleeve 15b is shiftable on the post 12 and carries also two half shells 15c' and 15d' which fit on the tubes 16. Vertical bolts 17 inserted through bores 17' and provided with nuts 18 shown in Fig. 2, secure the corresponding half shells together with the tubes 16 therein so that the latter are rigidly coupled together.

In assembling the cabin, the posts 12 are passed with their lower ends through bores 11 in the corners of the floor. The floor and posts may be held in their desired relative position by any conventional and suitable means, not shown, such as e. g. fixed or releasably attached collars, flanges or the like. Through other bores 13, stakes 9 may be driven into the ground.

After the walls have been unfolded, the vertical strips 20 and horizontal strips 21 may be applied thereto. At opposite sides of the cabin, where the roof is lowest, roof brackets 30 are provided, and the same bolt may be used to secure together a wall bracket 30, a vertical strip 20 and a horizontal strip 21, as indicated at 41 in Fig. 2.

With the strips 20 and 21 and the brackets 30 in place, the walls may be erected and fixed to the floor and cage structure. This will be effected by means of the vertical L-shaped bars 22 covering the cabin corners and also by means of tie-rods 23 or the like, which are hooked into eyes 24 secured to the cabin wall. The walls may be fixed to the floor by any conventional and suitable means, e. g. by means of little blocks 25 on the floor and to which the walls may be attached or by fillets extending throughout the walls. Furthermore, the aforementioned vertical strips 20 may also serve the same purpose by engaging into notches (not shown) of the floor. The roof unit, which comprises two large panels 50, 50', forming the gable and two narrow panels 51 and 51', is placed upon and carried by the upper edges of the walls so that the panels 50, 50' form the ridge 52 and that the narrow panels 51 and 51' in a horizontal plane also bear on the brackets 30. The upper ends 53 of the posts 12 project through bores in the panels 51 and 51' and nuts 54, which may be ornamented as shown, are screwed on the projecting ends 53 of the post 12. In addition, screw bolts 29 may be used to further secure the panels 51, 51' to the brackets 30. Also two brackets may be connected to the upper portion of the wall by inner tie-rods 23.

At least some of the large panels of the wall may be reinforced as shown at 55 to form a frame for a window 28, which may have a width of 30 inches. Similarly reinforcements may be provided in one of the walls and the floor to form a frame for a door, not shown.

The stiffening tie-rods 23 at the inner cabin corner may also be used to secure or carry furniture pieces. Reversely, the frame of a lower and upper bunk or parts of a closet may be utilized to increase the rigidity of the cabin structure.

It will be understood that many alterations and modifications of the structure illustrated and described can be made without departure from the spirit and essence of the invention which for that reason shall not be limited by the scope of the appended claims.

I claim:

1. A demountable cabin for camping purposes comprising a plurality of foldable units at least one to form the roof, at least one to form the walls, and at least one to form the floor of the cabin, each unit including a plurality of rigid panels and a continuous waterproof and flexible cover, said panels of each unit adhering to said cover of said unit and abutting one another edgewise, said flexible cover constituting an outermost skin-like layer of the cabin when assembled, a demountable cage-like metallic frame for interiorly reinforcing said cabin, said frame comprising vertical posts, connecting pieces adapted to be secured to said posts and including horizontally halved sleeves, and horizontal cage members releasably secured in said sleeves, and a plurality of upright strip-like members, attachable to the assembled cabin on the outside thereof along lines where on the cabin inside pairs of adjacent panels abut one another.

2. A cabin as in claim 1, said connecting pieces including screw bolts and nuts to tighten said halves together after the insertion of said horizontal cage members.

3. A cabin as in claim 1 wherein said foldable floor when unfolded is rectangular, further comprising two reinforcing channel profiles engaging the edges of the opposite sides of said floor rectangle which extend at right angles to the abutting edges of said floor panels.

4. A cabin as in claim 1, further comprising upright outer metal L-bars covering the corners, respectively, of the cabin, inner horizontal reinforcing pieces extending between at least some of said upright members, and connecting means between said uprights and said inner reinforcing pieces.

5. A cabin as in claim 1, further comprising upright outer metal L-bars covering the corners, respectively, of the cabin, roof supporting brackets secured to some of said uprights, and connecting means between some of said uprights and said brackets, respectively.

6. A cabin as claimed in claim 1, wherein, in at least one of said foldable unit panels, said panels differ in their width so that wider panels alternate with narrower panels, said wider panels decreasing in width as they succeed one another from a center line of the unfolded unit towards the edges parallel to said line, and said narrower panels decreasing in width in a similar manner said unit being so foldable that said flexible cover is inside of the folded panels.

7. A cabin as in claim 1, wherein the roof unit comprises two large panels forming a gable of the assembled cabin and two narrow panels adjacent said large panels, respectively, said roof unit bearing on the top edges of said walls when said cabin is erected, and said narrow panels being secured to the top ends of said posts which extend through said narrow panels.

References Cited in the file of this patent

UNITED STATES PATENTS

| | | |
|---|---|---|
| 359,749 | Tourgee | Mar. 22, 1887 |
| 1,218,665 | Johns | Mar. 13, 1917 |
| 1,250,415 | Aylwin | Dec. 18, 1917 |
| 1,622,746 | Truemper | Mar. 29, 1927 |
| 2,098,469 | Smith | Nov. 9, 1937 |
| 2,485,914 | Owens | Oct. 15, 1949 |
| 2,751,635 | Donnahue | June 26, 1956 |